(12) United States Patent
Vaniglia et al.

(10) Patent No.: US 11,027,505 B2
(45) Date of Patent: Jun. 8, 2021

(54) METHOD FOR CHECKING FORMATION OF BEADS OF TYRES

(71) Applicant: PIRELLI TYRE S.P.A., Milan (IT)

(72) Inventors: Erika Vaniglia, Milan (IT); Fabio Regoli, Milan (IT); Stefano Boracco, Milan (IT); Davide Conti, Milan (IT)

(73) Assignee: PIRELLI TYRE S.P.A., Milan (IT)

( * ) Notice: Subject to any disclaimer, the term of this patent is extended or adjusted under 35 U.S.C. 154(b) by 0 days.

(21) Appl. No.: 16/349,039

(22) PCT Filed: Nov. 27, 2017

(86) PCT No.: PCT/IB2017/057419
§ 371 (c)(1),
(2) Date: May 10, 2019

(87) PCT Pub. No.: WO2018/116031
PCT Pub. Date: Jun. 28, 2018

(65) Prior Publication Data
US 2019/0283351 A1 Sep. 19, 2019

(30) Foreign Application Priority Data
Dec. 20, 2016 (IT) .................. 102016000129048

(51) Int. Cl.
*B32B 41/00* (2006.01)
*B29D 30/00* (2006.01)
(Continued)

(52) U.S. Cl.
CPC ......... *B29D 30/0061* (2013.01); *B29D 30/32* (2013.01); *G06T 7/0004* (2013.01);
(Continued)

(58) Field of Classification Search
CPC ............ B29D 30/0061; B29D 30/32; B29D 2030/0066; B29D 2030/0665; G06T 7/62;
(Continued)

(56) References Cited

U.S. PATENT DOCUMENTS

2007/0023122 A1 2/2007 Moriguchi et al.
2014/0307941 A1 10/2014 Zanella et al.
(Continued)

FOREIGN PATENT DOCUMENTS

| CN | 101600562 A | 12/2009 |
|---|---|---|
| CN | 103649989 A | 3/2014 |

(Continued)

OTHER PUBLICATIONS

International Search Report for International Application No. PCT/IB2017/057419 filed on Nov. 27, 2017 on behalf of Pirelli Tyre S.P.A dated Apr. 11, 2018 4 pages.
(Continued)

*Primary Examiner* — Michael N Orlando
*Assistant Examiner* — Joshel Rivera
(74) *Attorney, Agent, or Firm* — Steinfl + Bruno, LLP (57) ABSTRACT

Method for checking the formation of beads of tyres including: arranging a carcass sleeve with formed beads with the carcass sleeve in rotation, acquiring at least an image of a circumferential portion of external surface including the respective edges of the end flaps turned up; processing the image in order to determine a circumferential trend of the axial distance of each edge from an axial reference plane; and detecting possible defects of the beads as a function of such trend.

16 Claims, 4 Drawing Sheets

(51) Int. Cl.
  *G06T 7/62*    (2017.01)
  *B29D 30/32*   (2006.01)
  *G06T 7/00*    (2017.01)
  *B29D 30/06*   (2006.01)

(52) U.S. Cl.
  CPC ........ *G06T 7/62* (2017.01); *B29D 2030/0066* (2013.01); *B29D 2030/0665* (2013.01); *G06T 2207/10004* (2013.01)

(58) Field of Classification Search
  CPC ......... G06T 7/0004; G06T 2207/10004; G06T 7/521; G06T 2207/10016; G06T 2200/04
  USPC .................... 156/60, 64, 350, 351, 378, 379
  See application file for complete search history.

(56) References Cited

U.S. PATENT DOCUMENTS

2014/0341460 A1* 11/2014 Ballabio ............... B60C 25/007
                                                          382/141
2016/0347014 A1    12/2016 Mancini et al.

FOREIGN PATENT DOCUMENTS

| CN | 104204762 A  | 12/2014 |
|----|--------------|---------|
| EP | 1061332 A2   | 12/2000 |
| EP | 2751539 A1   | 7/2014  |
| JP | H06166121 A  | 6/1994  |
| JP | 2010030243 A | 2/2010  |
| JP | 2013231612 A | 11/2013 |
| SU | 1260244 A1   | 9/1986  |
| WO | 2008/099236 A1 | 8/2008 |
| WO | 2010/013553 A1 | 2/2010 |
| WO | 2010/064084 A1 | 6/2010 |
| WO | 2013/011396 A1 | 1/2013 |
| WO | 2013/088334 A1 | 6/2013 |

OTHER PUBLICATIONS

Written Opinion for International Application No. PCT/IB2017/057419 filed on Nov. 27, 2017 on behalf of Pirelli Tyre S.P.A dated Apr. 11, 2018 6 pages.
European Office Action for EP Application No. 17830005 filed on behalf of Pirelli Tyre S.P.A. dated Jul. 24, 2020 6 pages.
Chinese Office Action for CN Application No. 201780075229.3 dated Nov. 27, 2017 on behalf of Pirelli Tyre S.P.A., dated Dec. 25, 2020 (partial English translation + Original), 25 pages.
Russian Office Action and Search Report for RU Application No. 2019120983/05 dated Nov. 27, 2017 on behalf of Pirelli Yyre S.P.A. dated Mar 23, 2021 17 pages (English + Original).

* cited by examiner

METHOD FOR CHECKING FORMATION OF BEADS OF TYRES

CROSS-REFERENCE TO RELATED APPLICATIONS

The present application is the U.S. National Stage of International Patent Application No. PCT/IB2017/057419 filed on Nov. 27, 2017 which, in turn, claims priority to Italian Patent Application No. 102016000129048 filed on Dec. 20, 2016.

TECHNICAL FIELD OF THE INVENTION

The present invention relates to a method for checking the formation of beads of tyres in a tyre production line, and a related station for forming the beads of said tyres. The present invention further relates to a related process and plant for production of tyres.

STATE OF THE ART

The production cycles of a tyre provide that, after a building process in which the different structural components of the tyre itself are realized and/or assembled in one or more building lines, a process of moulding and vulcanization is performed, the process determining the structural stabilization of the tyre through cross-linking of the elastomeric compositions as well as moulding on the same a desired tread design and eventual distinctive graphic signs.

Typically, a finished tyre has a substantially toroidal structure about a rotation axis of the same during operation, and presents an axial middle plane orthogonal to the rotation axis, said plane typically being a plane of (substantial) geometric symmetry (e.g. neglecting possible minor asymmetries, such as the tread design and/or the internal structure).

A finished tyre for vehicle wheels generally comprises a carcass structure, substantially toroidal, comprising at least a carcass ply having respectively opposite end flaps turned up around respective annular anchoring structures, comprising the so-called "bead cores", and incorporated in the zones usually identified with the term "beads". The beads have an inner diameter substantially corresponding to a so-called "fitting diameter" of the tyre on a respective mounting rim.

A belt structure can be coupled to the carcass structure in a radially external position, the belt structure comprising one or more belt layers, each one arranged in radial superposition with respect to the other and with respect to the carcass structure, and having textile or metallic reinforcing cords. A tread band is applied in a radially external position to the belt structure, the tread band being made of elastomeric material as other semi-finished products constituent of the tyre.

Respective "sidewalls" made of elastomeric material are further applied on the lateral surfaces of the carcass structure, each of the lateral surfaces extending from one of the lateral edge of the tread band to the respective annular anchoring structure.

Typically, an elastomeric material layer, usually called "liner", is arranged in a radially internal position with respect to the carcass ply, the elastomeric material layer having air-proof characteristics and extending from one to the other of the beads. Furthermore, an elastomeric material layer called "underliner" can be interposed between the carcass ply and the liner layer. The beads can be covered, at least partially, by so-called "abrasion-proof elements", made of elastomeric material too.

By "finished tyre" it is generally meant the tyre after the building, moulding and vulcanizing steps.

By "green tyre" it is generally meant a semi-finished product precursor of the finished tyre, the green tyre having tubular or toroidal shape, or related to them, in any phase of its building but in any case before the moulding and vulcanizing phases.

By "tyre" it is generally meant, depending by the context, the finished and/or the green tyre.

By "carcass sleeve" it is meant a tubular semi-finished product, before and/or after the bead formation step depending by the context, the semi-finished product comprising at least a carcass ply and further possible structural components steady coupled to the carcass ply, such as for example one or more of: liner, underliner, abrasion-proof elements, annular anchoring structures, etc.

By "end flaps" of the carcass sleeve it is generally meant the axially opposite tubular portions of the carcass sleeve which engage, after the turning up, the annular anchoring structures within the beads. Said term generally refers, depending by the context, to the end flaps before and/or after the turning up step (in this latter case they are also called "bead turned-up flaps").

By "edges of the turned-up end flaps" or "edges of the bead turned-up flaps" it is meant the axial end edges of the end flaps after the turning up, namely those edges which constitute the free axial ends of the end flaps before the turning up and which lay adherent to an axially internal portion of the carcass sleeve after the turning up. The edges are in the axially inner side of the bead turned-up flaps, opposite to the axial ends of the carcass sleeve after the turning up, said axial ends corresponding to the bends of the bead turned-up flaps.

By "bead formation" it is meant at least the combination of the step in which the annular anchoring structures are fitted or built on the end flaps of the carcass sleeve and of the subsequent step in which said end flaps are turned up about the annular anchoring structures. The bead formation can also include the steps of radial turning down of the end flaps and/or of rolling over of the turned-up flaps in order to compact the beads.

By the term "beads" it is meant the two structures, in the finished tyre or in the green tyre after the turning up of the end flaps of the carcass sleeve, which comprise at least the annular anchoring structures and the end flaps turned-up.

By "structural component" of the tyre it is meant any part of the tyre, or portion thereof, suitable for performing a function. Therefore, for example, structural components are: liner, underliner, abrasion-proof elements, annular anchoring structures, square woven fabric (made by a strip-like element comprising a plurality of mutually crossed cords embedded in an elastomeric material layer), bead core, bead fillers, carcass ply/ies, belt layer/s, underlayer of the belt structure, underlayer of the tread band, sidewalls, sidewall inserts, tread band, textile or metallic reinforcements, reinforcing elements in elastomeric material, etc.

By "steady coupling" or "steady coupled" it is meant a coupling which remains during the different phases of a building or production process of a tyre.

The terms "radial" and "axial" and the expressions "radially internal/external" and "axially internal/external" are used with reference to the radial direction, depending by the context, of the carcass sleeve or of the tyre (namely to a direction perpendicular to the axis of rotation of the tyre or of the carcass sleeve) and to the axial direction, depending by the context, of the carcass sleeve or of the tyre (namely to a direction parallel to the axis of rotation of the tyre or of the carcass sleeve). The terms "circumferential" and "circumferentially" are instead used with reference to the annular development, depending by the context, of the carcass sleeve or of the tyre.

By "substantially orthogonal" with respect to geometrical elements (such as lines, planes, surfaces etc.) it is meant that said elements form an angle of 90°+/−15°, preferably of 90°+/−10°.

By "substantially parallel" with respect to the aforesaid geometrical elements it is meant that said elements form an angle of 0°+/−15°, preferably of 0°+/−10°.

The terms "optical", "light" and the like refer to an exploited electromagnetic radiation which has at least a portion of its spectrum comprised within an enlarged interval of the optical band, and not necessarily strictly comprised in the optical band (namely 400-700 nm), for example said enlarged interval of the optical band can span from the ultraviolet to the infrared (for example a wavelength comprised between about 100 nm and about 1 μm).

By "digital image", or equivalently "image", it is generally meant a set of data, typically contained in an electronic file, in which each n-tuple of coordinates (typically each couple of coordinates) of a finite set (typically bi-dimensional and matricial, namely N rows×M columns) of n-tuples of spatial coordinates (each n-tuple corresponding to a "pixel") is associated to a respective set of numerical values (which can be representative of quantities of different type). For example, in the monochromatic images (like those in grayscale) said set of values consists in a single value within a finite scale (typically with 256 levels or tones), said value being for example representative of the light level (or intensity) of the respective n-tuple of spatial coordinates when visualized. A further example is represented by the colour images, in which the set of values represents the light level of a variety of colours, or channels, typically the fundamental colours (for example in the RGB coding red, green and blue, while in the CMYK coding cyan, magenta, yellow and black). The term "image" does not necessarily imply the actual visualization thereof. Each reference to a specific "digital image" (for example the digital image initially acquired on the carcass sleeve) more generally comprises any digital image achievable through one or more digital processing of said specific digital image (such as filtering, equalization, "smoothing", binarization, thresholding, morphologic transformations ("opening", etc.), integral or derivative computations, etc.).

The term "bi-dimensional image" or "2D" means an image to each pixel of whom is associated information representative of the reflectivity/diffusivity and/or of the surface colour, such as the images acquired by the common digital cameras (e.g. CCD).

The term "three-dimensional image" or "3D" denotes an image to each pixel of whom is associated information of the surface height.

By "digital camera" or shortly "camera" it is meant an opto-electronic device suitable for acquiring a digital bi-dimensional image and comprising a digital image sensor (or shortly "sensor"), and a lens (which is assumed to be of cylindrical geometry, although the invention is not only limited to said lenses).

By "optical axis" of a lens it is meant a symmetry line of rotation of the lens.

By "matricial camera" it is meant a camera whose sensor has the pixels arranged according to a rectangular matrix having the two dimensions of comparable length (for example the two dimensions differs by less than an order of magnitude, like in the formats 4×3 or 3×2). By extension a "matricial image" is a digital image acquired by a matricial camera.

By "laser source having a linear laser beam" or shortly "linear laser source" it is meant a laser source suitable for emitting a laser beam (named "linear laser beam") having section orthogonal to the propagation direction of linear shape (typically having its thickness), typically of straight segment shape.

By "propagation plane" of a linear laser beam it is meant the plane wherein the linear laser beam propagates (said line lying on the propagation plane).

By "linear portion of surface" it is meant a portion of surface having a dimension much greater than the other dimension orthogonal thereto, typically greater by two orders of magnitude. The smaller dimension of the linear portion of surface is typically less than or equal to 0.1 mm.

The carcass structure and the belt structure are generally made separately one from the other, and mutually assembled subsequently.

The manufacturing of the carcass structure typically envisages that one or more structural components, comprising at least a carcass ply and possibly one or more among the liner, the underliner and the abrasion-proof elements, are built and/or applied on a forming drum, for forming a carcass sleeve, typically substantially cylindrical.

For example, as shown in WO 08/099236 belonging to the same Applicant hereof, one or more among the liner, the underliner and the abrasion-proof elements can be built directly on the forming drum by supplying a continuous elongated element of elastomeric material and, while the forming drum rotates, by depositing said element on the forming drum according to coils typically side-by-side and/or at least partially superimposed. Subsequently, said at least a carcass ply is applied in a radially external position with respect to the structural component/s previously built, for example by deposition of strip-like elements mutually side-by-side.

According to a different manufacturing example, a semi-finished product called "complex" or "complex liner" can be made in form of continuous strip and comprising two or more among the liner, the underliner and the abrasion-proof elements, mutually steady coupled. Said complex is typically stored spooled, and subsequently applied cut to size on the forming drum. In a radially external position with respect to the complex, said at least a carcass ply is applied for example by feeding said at least a carcass ply to the rotating forming drum, said at least a carcass ply being in shape of continuous strip cut to size as well. Said manufacturing example is for example shown in WO 2013/011396 belonging to the same Applicant hereof.

For the formation of the beads, the bead annular anchoring structures, comprising the bead cores and possibly the bead fillers, are fitted, or built in place, on the opposite end flaps of the carcass sleeve, which are subsequently turned up about the same annular anchoring structures in order to enclose them in a kind of loophole. The turning up step is typically performed by inflatable bladders or by mechanical elements, for example rollers or lamellar elements.

In some realization techniques, before the fitting or the building of the annular anchoring structures, the end flaps are radially turned down towards the axis of the forming drum.

In various building processes, as shown in above WO 08/099236, the forming drum is associated, at least during a phase of the building of the carcass sleeve, to two auxiliary supports arranged on axially external parts of the forming drum, and coaxial with the forming drum, in order to form, in combination with the drum, an external surface, typically substantially cylindrical, on which the sleeve is built. The auxiliary supports are axially movable with respect to the forming drum, so that their moving apart allows to leave the opposite end flaps overhanging on the forming drum, thereby facilitating their turning down and/or turning up.

SUMMARY OF THE INVENTION

In the field of the tyre production processes, the Applicant has noticed that the formation of beads is a very important step since the conformity level of the beads to the defined specifications contributes in a significant way in determining the performance and safety characteristics of the finished tyre, having a direct impact on the uniformity characteristics and/or on its integrity during the use.

The Applicant has noticed that different kinds of bead defects can occur. Still the Applicant has also noticed that many factors can contribute to create defects in the beads, also depending by the technology applied.

For example, during the moving apart of said auxiliary supports from the forming drum for the purpose of formation of beads, it can occur that one of the two end flaps get axially dragged by the respective auxiliary support, dragging in turn with itself the whole carcass sleeve.

According to the Applicant this problem can occur in particular in a process like the one described in WO 08/099236, which envisages the use of continuous elongated elements of elastomeric material coiled for the building of various components. In this case it is in fact advantageous that there is a high adherence between at least a portion of the external surface of the drum and the elongated element.

Moreover, the residual tension of the continuous elongated element can create a "belt" effect on the drum, increasing the mutual adherence. Furthermore, the relatively high deposit temperature of the elongated element can increase the adherence to the drum. In particular, one or more of these problems can occur precisely at the two auxiliary supports with reference typically to the abrasion-proof elements, that tend to follow, in a differential way for the two inserts, the auxiliary supports in their axial movement.

In order to avoid or limit said unwilling dragging problem, at least a portion of radially external surface of the auxiliary supports can be treated for reducing the adherence, like shown for example in the document WO 2010/064084 of the same Applicant hereof. The Applicant has however noticed that in this case the treated surface can, along the time and/or with extended use, loose the non-stick properties, and that said functional deterioration is nowadays difficult to foresee and/or detect, also with programs of preventive maintenance control. In this case the Applicant has noticed the sudden and unpredictable occurrence of the aforesaid dragging problem.

In case in which the turning down group of an end flap is not sufficiently synchronous with the turning down group of the opposite end flap, an axial movement of the carcass sleeve towards the turning down group whose movement results earlier can occur. According to the Applicant this can occur in particular in processes like those shown in WO 2013/011396, which envisage the use of the aforesaid complex, which typically shows a low adherence to the forming drum.

In the aforesaid cases, the Applicant has noticed that the axial movement of the whole carcass sleeve with respect to the forming drum immediately before the application of the annular anchoring structures, in an automated formation process of beads, results in a axial miscentring of the carcass sleeve with respect to the annular anchoring structures themselves, with the consequent result of a geometrical asymmetry of the beads, for example a difference in the axial length of the bead turning ups. Such a defect means, besides a deterioration of the tyre performances, a likelihood of loss of integrity of the same.

The Applicant has also noticed, besides the asymmetry of the turned-up flaps, other kinds of bead defects, which can also be independent from the technology applied.

For example, a possible defect of the beads consists in a length of the bead turned-up flaps not consistent with the specifications, also when the turned-up flaps are symmetrical. This can be due to a missed or wrong placement of the bead cores, or to the placement of bead cores non-compliant to the specifications (for example in the dimensions).

Another possible defect of the beads is the formation of openings in the carcass sleeve at the edges of the end flaps turned-up. Said openings, typically with substantially axial development, are due to rips of the carcass sleeve, in particular of the carcass ply, which begin from the edges of the end flaps turned-up, in response to the forcing on a greater diameter sustained by the bead turned-up flaps during the turning-up, and can be due to structural defects of the ply (e.g. defects of the joints between pieces of complex, etc).

Still a possible defect of the beads consists in the presence of foldings at the edges of the bead turned-up flaps. In other terms, the edges of the bead turned-up flaps fold over themselves, forming an axial shift of the end line of the edges and/or a local lifting of the bead turned-up flaps.

The Applicant deems that one or more of said defects is difficult if not impossible to detect on the finished tyre, first of all because they are inside the body of the tyre and so they are not visible from the outside. In fact, the bead turned-up flaps, including their edges, after the turning up are covered by other structural components, such as sidewalls. Furthermore, the textile nature of the carcass ply comprised in the bead turned-up flaps does not allow a convenient use of known techniques, such as X rays or shearography.

US2007/0023122 A1 describes a method for inspecting the beads in a process for the production of tyres, by measuring the radial and axial distance of the metallic bead cores from respective sensors, for detecting the radial eccentricity of the bead cores.

JP2013231612 A describes a method for checking the state of paste of the bead cores, during the formation of a green tyre on a toroidal drum, by application in coils of a steel cable without envisaging the turning up of the end flaps of a carcass sleeve. In particular the height profile of the coils of the bead core is measured by comparing it with a reference profile.

According to the Applicant, both the aforesaid known techniques, limiting the inspection on the bead cores, are not capable of detecting one or more of the aforesaid bead defects, such as the openings or the foldings in the turned-up flaps or the axial asymmetry of the turned-up flaps due to axial shift of the sleeve.

The Applicant has noticed that in order to perform the checking of the bead defects "in line" in a plant for production of tyres, it is advisable that the checking itself is performed in short time, automatically and with limited costs and/or encumbrances.

The Applicant has faced the problem of checking in production line, and preferably on the whole of the produced tyres and without extending the production times, the quality of bead formation, looking for a plurality of kinds of bead defects.

The Applicant has also perceived that the use of an analysis of the images of the bead turned-up flap performed immediately after the end of their building, before proceeding with the completion of the tyre could properly fit the aforesaid constraints.

The Applicant has finally found that the solution to the aforesaid problem comprises the acquisition of images of the radially external surface of the carcass sleeve after the turning-up of the end flaps, and the subsequent processing of the images themselves in order to detect the circumferential trend of the axial position of the edges of the bead turned-up flaps, and starting from this the possible presence of bead defects.

According to an aspect the invention relates to a method for checking the formation of beads of tyres in a tyre production line.

Preferably it is provided to arrange a carcass sleeve having end flaps turned up around respective annular anchoring structures in order to form respective beads.

Preferably it is provided to rotate said carcass sleeve around an axis thereof.

Preferably during said rotation it is provided to acquire at least an image representative of at least a circumferential portion of radially external surface of said carcass sleeve, said at least a circumferential portion comprising respective edges of said end flaps turned up.

Preferably it is provided to process said at least an image in order to determine a circumferential trend of an axial distance of each edge from a reference plane on said carcass sleeve orthogonal with said axis.

Preferably it is provided to detect possible defects of said beads as a function of said trend.

According to another aspect the invention relates to a station for forming beads of tyres.

Preferably it is provided for a forming drum and rotation members for rotating the drum around an axis thereof.

Preferably it is provided members for fitting, or building, annular anchoring structures on opposite end flaps of a carcass sleeve arranged on said forming drum.

Preferably it is provided for turning up members for turning up said end flaps around said annular anchoring structures.

Preferably it is provided for an image acquisition system configured for acquiring at least an image representative of at least a circumferential portion of radially external surface of said carcass sleeve arranged on said forming drum, said at least a circumferential portion comprising respective edges of said end flaps turned up.

Preferably it is provided for a processing unit configured and programmed for processing said at least an image in order to determine a circumferential trend of an axial distance of each edge from a reference plane on said carcass sleeve orthogonal to said axis and to detect possible defects of said beads as a function of said trend.

According to a further aspect the invention relates to a process for forming beads of tyres in a tyre production line.

Preferably it is provided to arrange a carcass sleeve, comprising at least a carcass ply, on a forming drum such as opposed end flaps of the carcass sleeve are axially overhanging on the forming drum.

Preferably it is provided to fit axially, or to build, an annular anchoring structure on each end flap in a position radially external with respect to the latter.

Preferably it is provided to turn up the end flaps around the respective annular anchoring structures in order to form respective beads.

Preferably it is provided to perform the method for checking the formation of beads according to the present invention on said carcass sleeve on said forming drum, said carcass sleeve having end flaps turned up, in order to detect possible defects of said beads.

According to a still further aspect the invention relates to a tyre production process.

Preferably it is provided to build a carcass sleeve on a forming drum, wherein the forming drum is associated to two auxiliary supports arranged at axially external sides of the forming drum and wherein the carcass sleeve comprises at least a carcass ply.

Preferably it is provided to axially move apart the two auxiliary supports from the forming drum such as to leave the opposite end flaps of the carcass sleeve axially overhanging on the forming drum.

Preferably it is provided to form the beads according to the process for forming beads according to the present invention.

Preferably it is provided to apply, after said process for forming beads, further structural components above said end flaps turned up, in a radially external position.

Preferably it is provided to couple said carcass sleeve with a crown structure in order to realize a complete green tyre.

Preferably it is provided to mould and vulcanize said complete green tyre in order to produce a finished tyre.

According to the Applicant, the aforesaid characteristics, in particular acquiring at least a digital image comprising the circumferential edges of the two end flaps after the turning up and processing the image to determine the circumferential trend of the axial distance of each edge from a respective axial reference plane on the carcass sleeve and, as a function of this trend, detecting possible defects of the beads, allow to check in a fast and automatic way the possible presence of a series of types of defects of the beads, including the geometrical asymmetry of the bead turned-up flaps, the wrong axial length of the bead turned-up flaps, the openings in the carcass sleeve at the edges of the bead turned-up flaps and the foldings of the bead turned-up flaps, as described above. In fact, the Applicant realized that said defects are detectable by the circumferential trend of the axial position of the edges of the bead turned-up flaps along the circumferential development. For example, in case the average value, along the circumferential development, of the axial position of an edge differs from the target value more than a threshold value, it means that the respective bead turned-up flap is axially too long or too short (e.g. by wrong positioning of the respective bead core, or by wrong diameter of the respective bead core or, in case of corresponding defect on the opposite bead turned-up flap, by wrong axial centering of the carcass sleeve with respect to the two bead cores due to an axial sliding of the sleeve).

Said fast and automatic check can therefore, in principle, be implemented within the production line and performed on the 100% of the tyre production, preferably without extending the production time. It follows that possible bead defects can be detected almost in real-time, namely immediately after the bead formation, so allowing:

the reject of defective carcass sleeves at an early production step (as compared to the reject of a complete green tyre or even a finished tyre), the real-time alert of a problem in the process/station of bead formation (for example the loss of functionality of the non-stick coating), with the resulting possibility to stop the process and solve the problem, before said problem determines the production of a series of defective carcass sleeves/tyres, the possibility to correlate the data acquired about the edges of the bead turned-up flaps with the process parameters, and/or with the quality check data of the tyres (such as the uniformity data).

Furthermore, as far as the station and the bead formation process according to the present invention are concerned, the fact of checking the bead formation on the same forming drum on which the beads have been formed, allows to optimize the spaces and/or the overall time of production, exploiting possible downtimes within the cycle of bead formation.

Still, in the process of production of tyres according to the present invention, the fact of forming and checking the beads on the forming drum on which the carcass sleeve has been built, allows to optimize the spaces and/or the overall times of production.

The present invention, in one or more of the aforesaid aspects, can further comprise one or more of the preferred characteristics hereafter described.

Preferably acquiring said at least an image comprises acquiring, during said rotation, two images each one representative of a respective circumferential portion of radially external surface of said carcass sleeve, each of said respective circumferential portions comprising one respective of said edges of said end flaps turned up.

Preferably said two images are acquired by an image acquisition system which comprises two acquisition devices wherein each one of the latter acquires one respective of said images.

Preferably processing said at least an image comprises processing said two images in order to determine said circumferential trend of the axial distance of each edge.

Preferably the image acquisition system comprises two acquisition devices each one configured for acquiring a respective image representative of a respective circumferential portion of radially external surface of said carcass sleeve, each respective circumferential portion comprising one respective of said edges of said end flaps turned up, and said processing unit is configured and programmed for processing said two images in order to determine said circumferential trend of the axial distance of each edge.

In this way it is advantageously possible to check each single edge independently, so increasing the flexibility and/or accuracy.

Preferably each acquisition device is movable along an axial direction independently from the other acquisition device. In this way the acquisition system can be adjusted to carcass sleeves of different sizes.

Preferably each respective circumferential portion of radially external surface has axial width greater than or equal to about 20 mm, more preferably greater than or equal to about 50 mm, and/or less than or equal to about 200 mm, more preferably less than or equal to about 150 mm. In this way it is included the edge with its fluctuations.

Preferably it is provided to arrange said carcass sleeve on a forming drum. This in order to facilitate its rotation during the image acquisition and to integrate the checking method with the production process.

Preferably said reference plane for one or both of the edges lays in a position axially central of the carcass sleeve, more preferably also in a position axially central of the forming drum. Said reference is in fact easy to be determined, for example referring the axial position of the acquisition system with respect to the axial centre of the drum.

Preferably said at least a circumferential portion of radially external surface of carcass sleeve further comprises respective end terminals of said carcass sleeve and it is provided to process said at least an image in order to determine a trend of an axial distance of said edges from said respective end terminals along a circumferential development.

Preferably acquiring said at least an image comprises acquiring in succession, during the rotation of the carcass sleeve, at least a series of images representative of at least a series of distinct linear portions of said at least a circumferential portion of radially external surface of carcass sleeve, and obtaining said at least an image combining said at least a series of images. The method of acquisition by linear portions of surface fits very well to the tubular or toroidal shape of the checked articles.

Preferably said at least an image is a three-dimensional image. The Applicant has in fact verified that acquiring and analysing three-dimensional images of the surface of the carcass sleeve provides the best results in terms of accuracy, reliability and/or completeness of information, compared to other kinds of images such as for example 2D images (by the way envisaged by the present invention). For example, the edge of the turned-up flaps is detected precisely in the 3D images thanks to the height gap associated to it.

Preferably acquiring said at least one three-dimensional image comprises radiating in succession at least a series of linear portions of said at least a circumferential portion of radially external surface of carcass sleeve with at least a linear laser beam and acquiring, along an optical axis, at least a series of bi-dimensional and matricial images representative respectively of at least a series of respective portions of radially external surface each comprising one respective of said linear portions.

Preferably each of said bi-dimensional and matricial images comprises a respective reflected laser line which represents said at least a linear laser beam reflected by one respective of said linear portions of said at least a circumferential portion of surface.

Preferably it is provided to identify within each of said bi-dimensional and matricial images said respective reflected laser line and to process said reflected laser line by triangulation in order to obtain a respective three-dimensional image of the respective linear portion of surface, comprising information related to a height profile of said respective linear portion of surface.

Preferably said acquisition system comprises at least a triangulation 3D sensor, more preferably a laser triangulation 3D sensor, still more preferably a linear laser beam triangulation 3D sensor.

Preferably each acquisition device is a triangulation 3D sensor, more preferably a laser triangulation 3D sensor, still more preferably a linear laser beam triangulation 3D sensor.

Typically, each 3D sensor comprises a matricial camera, having an optic axis and suitable for acquiring matricial and bi-dimensional images, and a linear laser source configured to emit a linear laser beam having a direction of propagation.

Preferably said camera comprises a processing unit configured for identifying within each matricial and bi-dimensional acquired image a laser line reflected by a linear portion of surface comprised in said matricial and bi-dimensional image, and for processing said reflected laser line by triangulation in order to obtain a three-dimensional image comprising information related to a height profile of said linear portion of surface. Typically, an acute angle formed between said optic axis and a direction of propagation of said linear laser beam is greater than or equal to 5° and less than or equal to 45°.

According to the Applicant, the 3D image obtained by the method of triangulation of the reflected linear laser line is comprehensive as regards information, accurate, fast and cost-effective to acquire. According to the Applicant said technology well suits the current plants for automatic bead formation, because of the compactness of the commercially available devices and of the reduced operation distance from the carcass sleeve. Furthermore, said technology is sufficiently tolerant to the variability of the characteristics of reflectance of the analysed material, that causes changes in brightness, and to the geometrical aspect after the turning up. Preferably a direction of propagation of said linear laser beam is parallel to a radial direction of said carcass sleeve or of said drum. In this way the quality of the obtained 3D image is optimal.

Preferably respective propagation directions of the laser beam of said two acquisition devices are arranged mutually parallel during the acquisition. More preferably respective propagation planes of the linear laser beam of said two acquisition devices are arranged mutually coplanar during the acquisition. In this way the acquisition system is self-consistent in terms of acquired images on the two edges.

Preferably respective propagation planes of the linear laser beam of said two acquisition devices are arranged substantially parallel to said axis during the acquisition. In this way the laser line is substantially perpendicular to the edges, so reducing their shadow.

Preferably a respective propagation direction of each linear laser beam impinges at the respective edge during the acquisition. In this way the edge is approximately in the centre of the operative field of the acquisition devices.

Preferably it is provided a support frame on which said acquisition system is installed, wherein said support frame is movable along a radial direction with respect to said forming drum. In this way the check can be adjusted to different sizes of the drum/carcass sleeve (adjusting the radial distance of the acquisition system from the carcass sleeve) and the acquisition system can be moved away from the drum to limit its hindrance and/or for its maintenance.

Preferably processing said at least an image comprises computing one or more of the following quantities: average of the distance along a circumferential development, standard deviation of the distance along a circumferential development, minimum and maximum displacement of the distance along a circumferential development, amplitude and phase of a displacement sinusoid of the distance along a circumferential development. According to the Applicant said quantities significantly correlates to the sought defects and/or to the uniformity parameters of the finished tyre.

Preferably detecting possible defects of said beads comprises detecting one or more of the following defects: asymmetry of an axial length of the end flaps turned up, wrong axial length of the end flaps turned up, openings on the end flaps turned up and foldings in the end flaps turned up.

Typically said carcass sleeve comprises at least a carcass ply and one or more of the following structural components, steady coupled to the carcass ply and in a position radially internal to the carcass ply: liner, under-liner, abrasion-proof elements.

Preferably, before axially fitting, or building, said annular anchoring structures, it is envisaged to radially turn down said end flaps.

Preferably, after said process for forming beads and before said application of further structural components, it is envisaged to roll over said end flaps turned up. In this way the bead structure becomes compact.

Typically said further structural components of elastomeric compound comprise sidewalls.

Further characteristics and advantages will be more evident in the detailed description of several exemplary but not exclusive embodiments of the present invention.

DESCRIPTION OF THE FIGURES

Said description will be presented hereafter with reference to the attached figures, provided solely for indicative purpose and, therefore, not limiting, in which.

DETAILED DESCRIPTION

Figure 1:
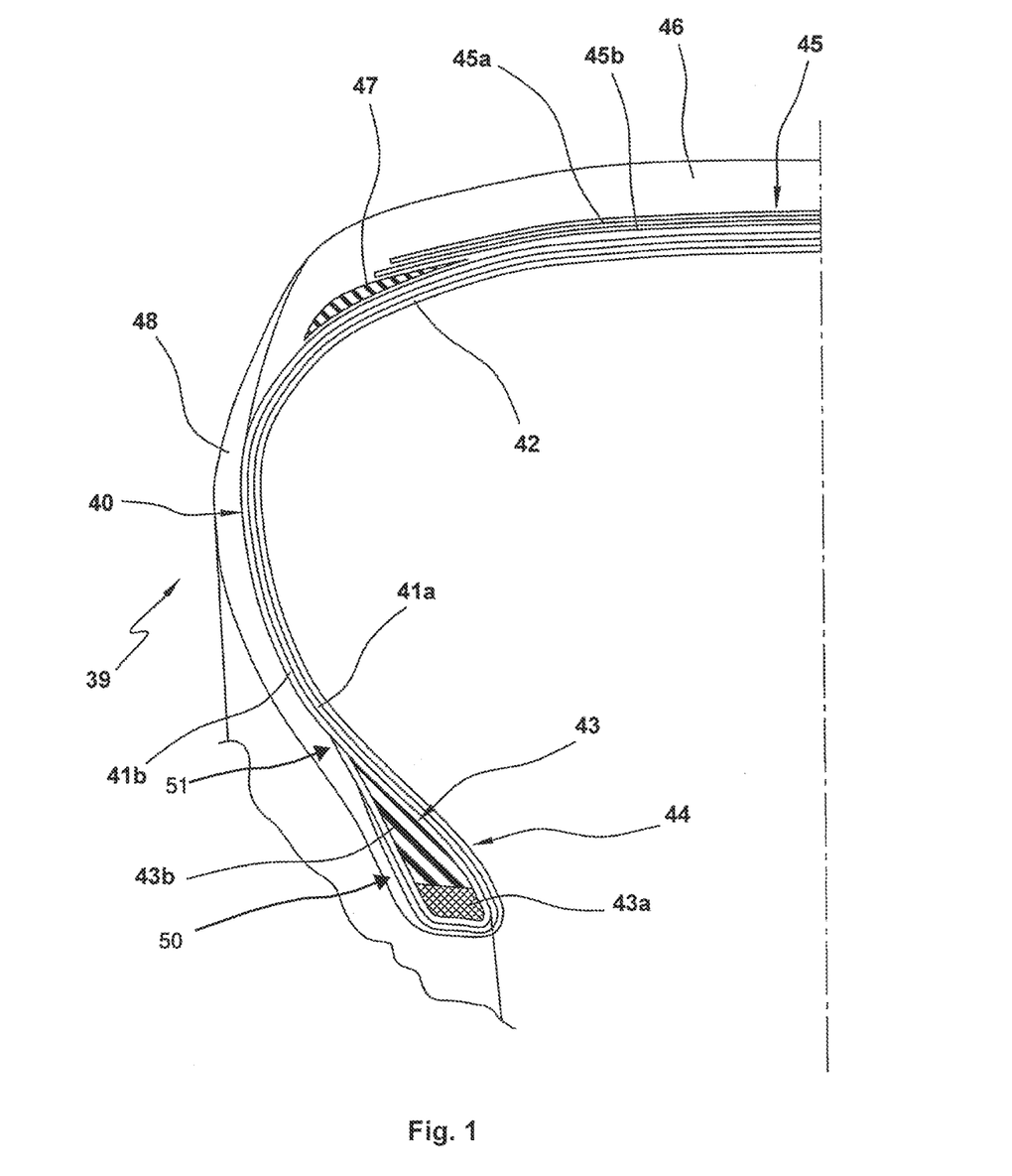
FIG. 1 schematically shows a tyre in half-section along a radial plane.

FIG. 1 shows an example of a finished tyre 39 which can be checked during its production according to the present invention.

The tyre 39 comprises essentially a carcass structure 40 conformed to a substantially toroidal configuration including at least a carcass ply 41a, 41b. A layer of waterproof elastomeric material or liner 42 is applied in a radially internal position of the carcass ply/ies 41a, 41b. Two annular anchoring structures 43, each one comprising a so-called bead core 43a carrying a bead filler 43b, are engaged to respective end portions of the carcass ply/ies 41a, 41b. The annular anchoring structures 43 are arranged in the proximity of zones usually identified with the term "beads" 44, at which usually occurs the engagement between the tyre 39 and a respective mounting rim (not shown).

Typically, the beads are externally coated with abrasion-proof elements (not shown).

A belt structure 45, comprising many belt layers 45a, 45b, is circumferentially applied around the carcass ply/ies 41a, 41b, in a radially external position with respect to the carcass ply/ies, and a tread band 46 is circumferentially overlapped to the belt structure 45, in a radially external position with respect to the belt structure.

The so-called "under-belt inserts" 47 can be associated to the belt structure 45, each one collocated between the carcass ply/ies 41a, 41b and one of the axially opposite terminal edges of the belt structure 45. Two sidewalls 48, each one extending from the respective bead 44 to a respective lateral edge of the tread band 46, are applied at lateral opposite positions of the carcass ply/ies 41a, 41b.

With the reference number 50 are overall indicated the end flaps of the carcass sleeve (in the figures after their turning-up).

Figure 2:
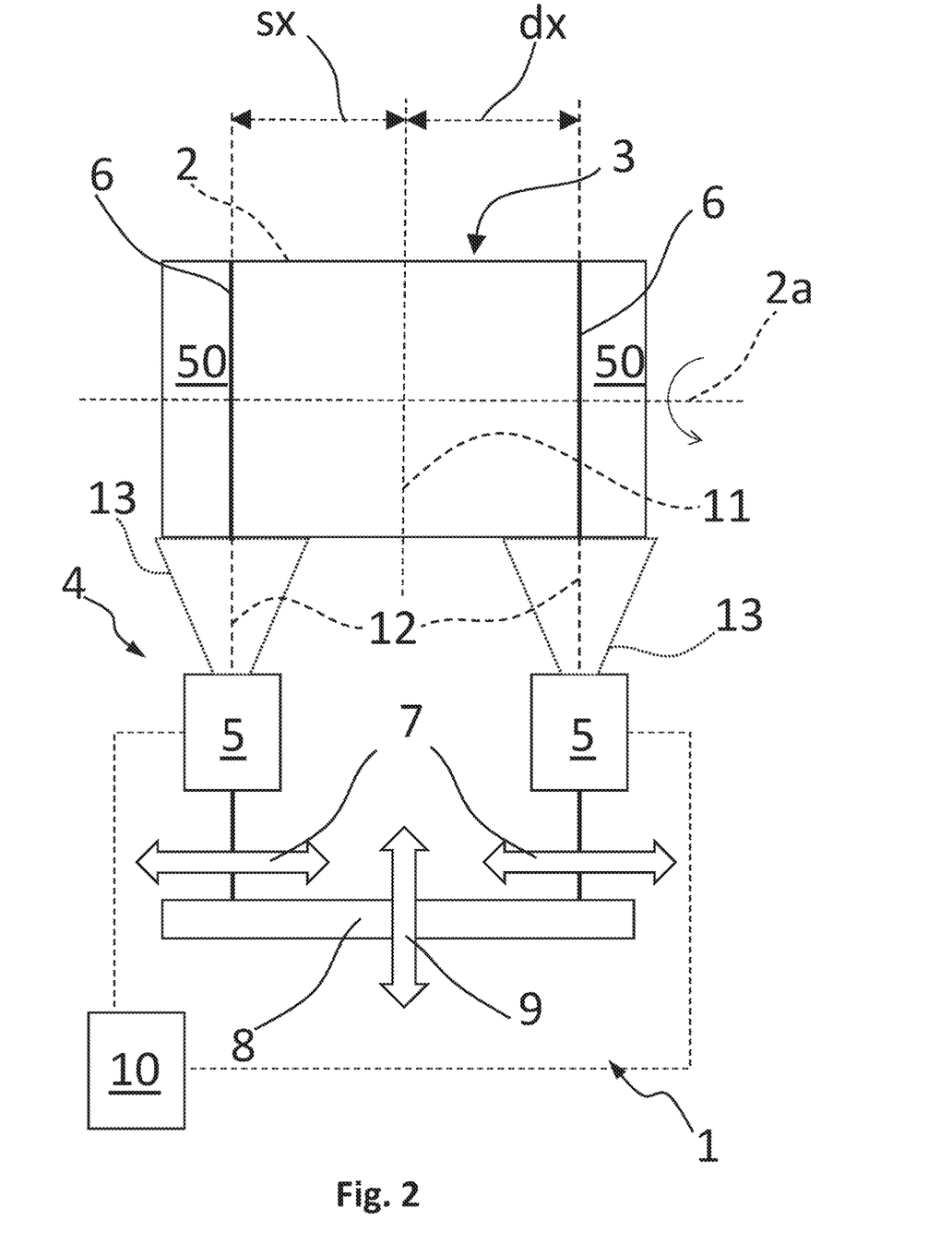
FIG. 2 shows a schematic and logic units view of a station according to the present invention.

In FIG. 2 it is schematically shown a station 1 for forming beads 44 of tyres 39.

The station comprises a forming drum 2 (not shown in figure because during operation it is precisely covered by a carcass sleeve 3, as shown in FIG. 2) and rotation members (not shown) of the drum about an axis 2a. Typically, the station comprises fitting, or building, members of annular anchoring structures 43 on opposite end flaps 50 of the carcass sleeve 3 and turning-up members of the end flaps about the annular anchoring structures. The fitting and turning-up members are not shown or described in detail since they can be, for example, of known type.

Preferably the station 1 comprises an image acquisition system 4.

In the shown example the image acquisition system 4 comprises two acquisition devices 5 each one configured for acquiring a respective image representative of a respective circumferential portion of radially external surface of the carcass sleeve 3, each respective circumferential portion comprising an edge 6 of a respective end flap turned up 50.

Preferably each acquisition device 5 is movable along an axial direction 7 independently from the other acquisition device.

Preferably the station 1 comprises a support frame 8 on which it is mounted the acquisition system 4, the support frame being movable along a radial direction 9 with respect to the drum 2.

Preferably the station 1 comprises a processing unit 10 configured and programmed for processing the images acquired by the acquisition system 4 in order to determine a circumferential trend of the axial distance (sx, dx) of each edge from a reference plane 11 on the carcass sleeve orthogonal to the axis 2a and to detect possible defects of said beads as a function of said trend.

Exemplary the reference plane 11 lays in an axially central position with respect to the drum 2 and so, the sleeve being centred on the drum, in an axially central position of the carcass sleeve. However, the present invention includes determining the distance of the edges from any plane of reference, for example respectively from the planes on which lay the axial ends of the carcass sleeve (in this case the axial length of the part of the bead turned-up flaps 50 corresponding to the external surface of the sleeve, which is the part shown in FIG. 2, can be determined).

In a preferred realization form, as shown in FIG. 2, each acquisition device 5 is a linear laser triangulation 3D sensor and comprises a matricial camera (not shown), having an optical axis, and a linear laser source (not shown) suitable for emitting a linear laser beam 13 having a direction of propagation 12. Preferably each camera comprises a processing unit (not shown) configured for identifying within each bi-dimensional and matricial image acquired by the camera a laser line reflected by a linear portion of surface comprised within the bi-dimensional and matricial image, and for processing by triangulation the reflected laser line in order to obtain a three-dimensional image comprising information relating to a height profile of the linear portion of surface enlightened by the laser beam.

For example, each acquisition device 5 can be a laser triangulation 3D sensor Gocator 2330 marketed by the LMI Technologies Inc.

The present invention also includes other solutions (not shown) of acquisition of images representative of the radially external surface of the carcass sleeve.

For example, the 3D image can be acquired by triangulation based on non-coherent light and/or with light structured on more complex schemes than a single line, for example parallel line schemes or grid schemes.

Alternatively, the 3D images can be acquired with other known techniques, such as the time-of-flight scanner.

Still, in a realization form (not shown) a single 3D sensor (for example a laser triangulation sensor as previously described), rather than the two sensors 5 of the shown example, acquires a circumferential portion of surface comprising both the edges 6.

Still, the present invention includes the acquisition of one or more 2D matricial images (e.g. the common digital images) of the circumferential portions of the radially external surface of the carcass sleeve, and their subsequent processing (also without a 3D reconstruction of the surface) with known algorithms, for example for the edge recognition. The acquisition of the 2D images can also be combined with a proper illumination, for example scattered light or grazing light (for example grazing light with light direction predominantly axial, so as the edge generates a shadow easily recognisable by the algorithms).

During operation, the station 1 is suitable for implementing an exemplary method for the checking of formation of beads of tyres within a production line of tyres according to the present invention.

Preferably said method is implemented within the same station in which the beads are formed and therefore it can be part of a bead formation process as follows.

First of all, a carcass sleeve 3 is built comprising at least a carcass ply 41a, 41b on the forming drum 2 so as the opposite end flaps 50 (more precisely their turned-up portion) of the carcass sleeve are axially overhanging on the drum.

Typically, the forming drum 2 is associated, during the building of the carcass sleeve, to two auxiliary supports (not shown) arranged on axially external sides of the forming drum. The two auxiliary supports are typically axially moved apart from the forming drum 2 in order to leave the end flaps axially overhanging on the drum 2.

At this stage it is envisaged to axially fit, or directly build in place, an annular anchoring structure 43 on each end flap 50 in a radially external position of the latter.

According to some constructive techniques, before axially fitting, or building, the annular anchoring structures, the end flaps are radially turned-down.

Therefore, the end flaps 50 are turned-up about the respective annular anchoring structures in order to form respective beads 44.

At this stage the method for checking the formation of beads of tyres according to the present invention is performed (typically exploiting a downtime of the station 1) on the carcass sleeve placed on the drum and having the end flaps turned-up 50.

First of all, the forming drum 2 and so the carcass sleeve 3 are put in rotation about the common axis 2a.

Before starting the rotation, or preferably meanwhile the drum reaches the desired speed, the acquisition system 4 is properly placed with respect to the carcass sleeve.

In the shown example, based on linear laser triangulation, an optimal placement envisages a movement of the frame 8 along the radial direction 9 in order to set the devices 5 at the correct radial distance from the radially external surface of the sleeve.

Furthermore, the direction of propagation 12 of the linear laser beam 13 of both the devices is maintained along the radial direction and the two propagation planes are maintained mutually coplanar and parallel to the axis 2a.

Preferably the propagation direction 12 of each linear laser beam 13 impinges at the respective edge 6. In other terms the edges are preferably placed in the centre of the acquisition field of the acquisition device 4.

At this stage each acquisition device 4 acquires, during the rotation, a respective image representative of a respective circumferential portion of radially external surface of the carcass sleeve and comprising a respective edge 6.

Exemplary each circumferential portion of radially external surface has axial width equal to about 80 mm, corresponding approximately to the width of the laser line.

Preferably the image acquisition takes place by lines. For this purpose, each device 4 acquires in succession, during the rotation of the carcass sleeve 3, a respective series of linear 3D images representative of a series of contiguous linear portions of the respective circumferential portion of radially external surface of carcass sleeve. The overall image of the whole circumferential portion is obtained by combining the series of linear images.

Preferably each device 4 radiates in succession the aforesaid series of linear portions with a linear laser beam 13 and acquires a respective series of bi-dimensional and matricial images respectively representative of a series of respective portions of radially external surface each one comprising a respective linear portion, wherein each bi-dimensional and matricial image comprises a respective reflected laser line which represents the linear laser beam reflected by the respective linear portion of surface.

Preferably each device 4 identifies within each bi-dimensional and matricial image the respective reflected laser line and processes the reflected laser line by triangulation in order to obtain a respective three-dimensional image of the respective linear portion of surface, comprising information relating to the height profile of the respective linear portion of surface.

Once the two overall three-dimensional images of the two whole circumferential portions comprising the respective edge 6 are obtained, the processing unit 10 processes them in order to detect possible bead defects, such as: asymmetry of the axial length of the end flaps turned-up, wrong axial length of the end flaps turned-up, openings in the end flaps turned-up and foldings in the end flaps turned-up.

Said processing is based for example on the trend, along the circumference of the carcass sleeve 3, of the axial distance sx, dx of the edges from the reference plane. In case in which the statistics of the distance along the circumference is anomalous, the processing unit 10 can send an alert signal to the operator and the carcass sleeve is removed from the production line. For example, the average value of the distance dx or sx along the whole circumference can differ from the specification value by a value greater, in modulus, than the threshold value. For specific example, if fixed the threshold value at 2 mm, the average value of the distance dx is 5 mm greater than the specification value, so 3 mm greater than the threshold value, and the average value of the distance sx is 4 mm less than said specification value, so 2 mm less than the threshold value, it is possible that an axial shift of the carcass sleeve with respect to the drum has occurred.

Figure 3A:
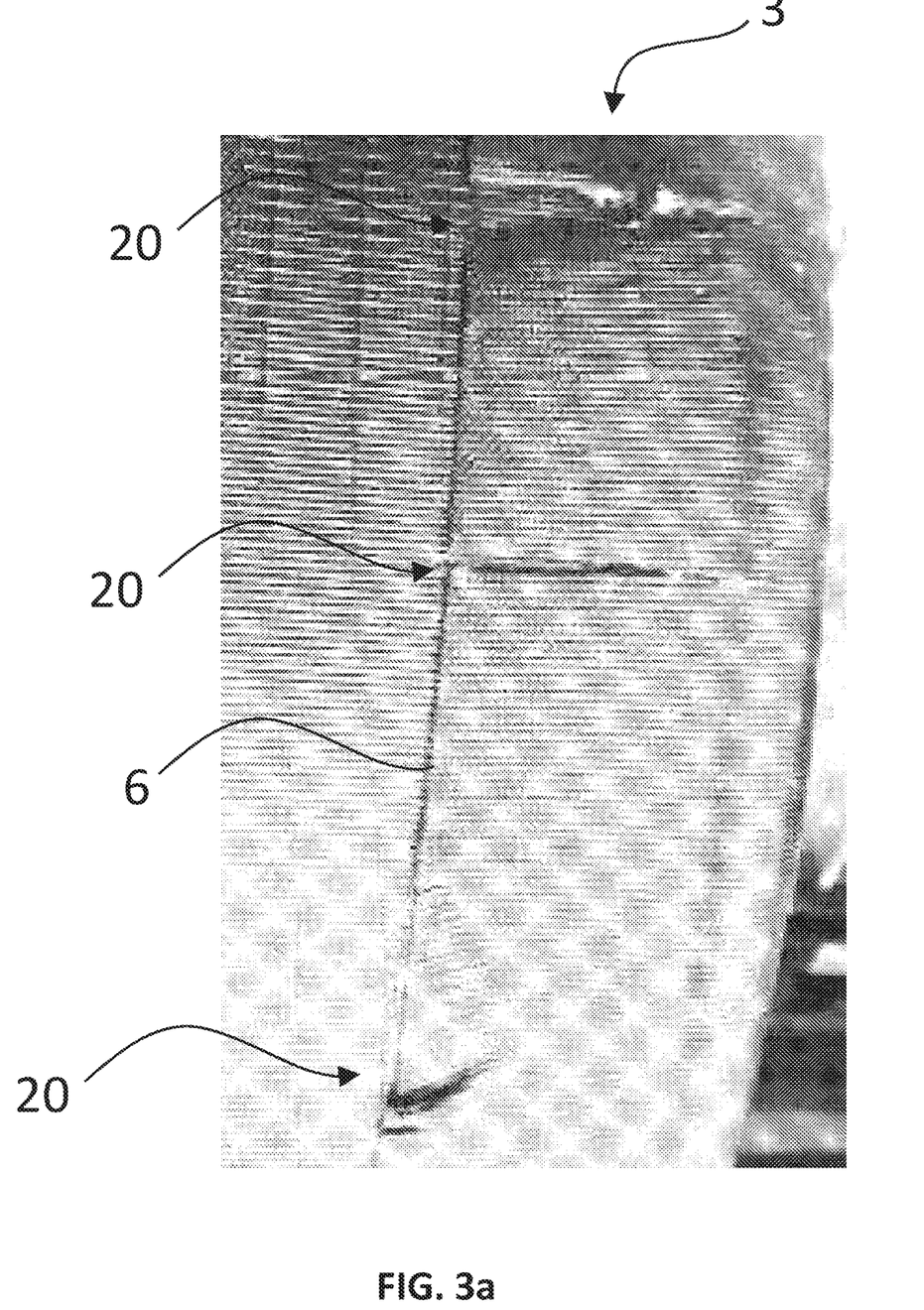
FIG. 3a shows a 2D picture of a carcass sleeve with some openings of the carcass ply.
Figure 3B:
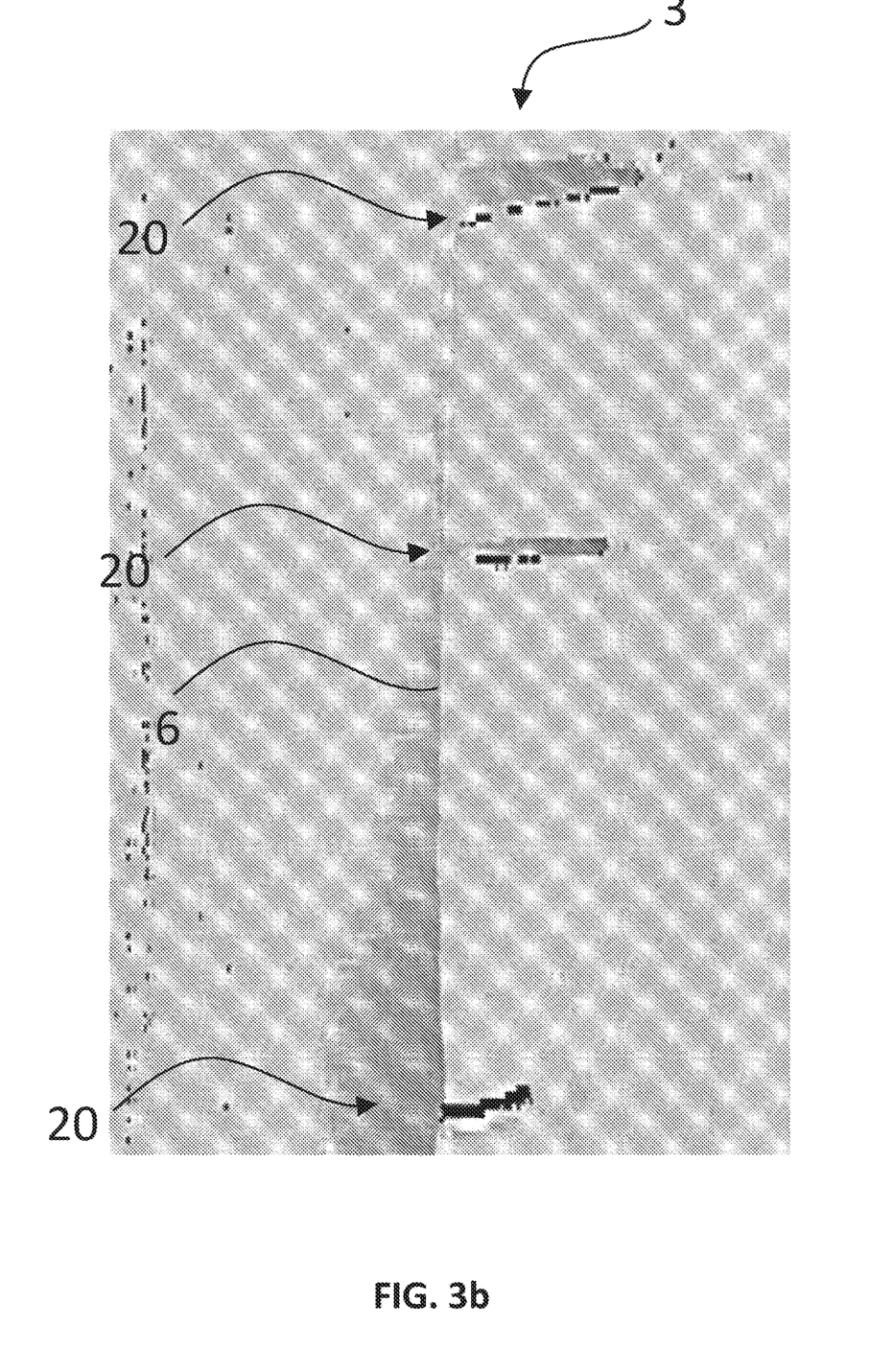
FIG. 3b shows a 3D image in grayscale of the surface portion of the carcass sleeve corresponding to FIG. 3a, as acquired by the acquisition system of the present invention.

If for example a maximum shift of the distance is too high, possibly associated to a too high standard deviation, it is possible that an opening 20 in the ply has occurred (FIGS. 3a and 3b).

For further example, the processing unit 10 can also process the three-dimensional images in order to identify possible volumes of missing or excess material with respect to the expected circumferential trend of the bead turned-up end, in order to highlight possible foldings or openings. Typically, subsequently to the formation of the beads the end flaps turned-up are rolled over.

The carcass sleeve so checked is sent to the subsequent steps of production of a tyre, among them it is typically envisaged the application of the sidewalls above the end flaps turned-up, in a radially external position.

The invention claimed is:

1. A method for checking the formation of beads of tyres in a tyre production line, the method comprising:
   arranging a carcass sleeve having end flaps turned up around respective annular anchoring structures in order to form respective beads;
   rotating said carcass sleeve around an axis thereof;
   during said rotation, acquiring at least one image representative of at least one circumferential portion of a radially external surface of said carcass sleeve, said at least one circumferential portion comprising respective edges of said end flaps turned up;
   processing said at least one image in order to determine a circumferential trend of an axial distance of each edge from a reference plane on said carcass sleeve orthogonal with said axis; and
   detecting possible defects of said beads as a function of said trend.

2. The method according to claim 1, wherein
   acquiring said at least one image comprises acquiring, during said rotation, two images each one representative of a respective circumferential portion of the radially external surface of said carcass sleeve, each of said respective circumferential portions comprising one respective of said edge of said end flaps turned up, wherein
   said two images are acquired by an image acquisition system which comprises two acquisition devices each acquiring one respective image of said images, and wherein
   processing said at least one image comprises processing said two images in order to determine said circumferential trend of the axial distance of each edge.

3. The method according to claim 2, wherein each respective circumferential portion of the radially external surface has an axial width greater than or equal to about 20 mm, and less than or equal to about 200 mm.

4. The method according to claim 1, wherein
   arranging said carcass sleeve comprises arranging the carcass sleeve on a forming drum and wherein
   said reference plane for one or both of the edges lays in an axially central position of the carcass sleeve and in an axially central position of the forming drum.

5. Method The method according to claim 1, wherein acquiring said at least one image comprises
   acquiring in succession, during the rotation of the carcass sleeve, at least one series of images representative of at least one series of distinct linear portions of said at least one circumferential portion of the radially external surface of carcass sleeve, and
   obtaining said at least one image combining said at least one series of images.

6. The method according to claim 2, wherein said at least one image is a three-dimensional image.

7. The method according to claim 6, wherein acquiring said at least one three-dimensional image comprises
   radiating in succession at least one series of linear portions of said at least one circumferential portion of the radially external surface of the carcass sleeve with at least one linear laser beam and
   acquiring, along an optical axis, at least one series of bi-dimensional and matricial images representative respectively of at least one series of respective portions of the radially external surface each comprising one respective of said linear portions, wherein each of said bi-dimensional and matricial images comprises a respective reflected laser line which represents said at least one linear laser beam reflected by one respective of said linear portions of said at least one circumferential portion of surface, and wherein the method further comprises identifying within each of said bi-dimensional and matricial images said respective reflected laser line and processing said reflected laser line by triangulation in order to obtain a respective three-dimensional image of the respective linear portion of surface, comprising information related to a height profile of said respective linear portion of surface.

8. The method according to claim 7, wherein a propagation direction of said linear laser beam is parallel to a radial direction of said carcass sleeve.

9. The method according to claim 6, wherein each acquisition device is a linear laser beam triangulation three-dimensional sensor, wherein respective propagation directions of the linear laser beam of said two acquisition devices are arranged mutually parallel during the acquisition and wherein respective planes of propagation of the linear laser beam of said two acquisition devices are arranged in a mutually coplanar manner during the acquisition.

10. The method according to claim 9, wherein respective propagation planes of the linear laser beam of said two acquisition devices are arranged substantially parallel with said axis during the acquisition and wherein a respective propagation direction of each linear laser beam impinges at the respective edge during the acquisition.

11. The method according to claim 1, wherein processing said at least one image comprises computing one or more of the following quantities: average of a distance along a circumferential development, standard deviation of the distance along the circumferential development, maximum and minimum displacement of the distance along the circumferential development, amplitude and phase of a displacement sinusoid of the distance along the circumferential development.

12. The method according to claim 1, wherein detecting possible defects of said beads comprises detecting one or more of the following defects: asymmetry of an axial length of the end flaps turned up, wrong axial length of the end flaps turned up, openings on the end flaps turned up and foldings in the end flaps turned up.

13. A process for forming beads of tyres in a tyre production line, the process comprising:

arranging a carcass sleeve comprising at least one carcass ply on a forming drum, such that opposed end flaps of the carcass sleeve are axially overhanging on the forming drum;

axially fitting or building an annular anchoring structure on each end flap in a position radially external with respect to the end flap;

turning up the end flaps around the respective annular anchoring structures in order to form respective beads;

performing the method for checking the formation of beads according to claim 1 on said carcass sleeve on said forming drum , said carcass sleeve having the end flaps turned up, in order to detect possible defects of said beads.

14. The process according to claim 13, comprising, before axially fitting or building said annular anchoring structures, radially turning down said end flaps.

15. A tyre production process comprising:

building a carcass sleeve on a forming drum, wherein the forming drum is associated to two auxiliary supports arranged at axially external sides of the forming drum and wherein the carcass sleeve comprises at least one carcass ply;

axially moving apart the two auxiliary supports from the forming drum to leave opposite end flap of the carcass sleeve axially overhanging on the forming drum;

forming beads according to the process for forming beads according to claim 13;

applying, after said process for forming beads, further structural components above said end flaps turned up, in a radially external position;

coupling said carcass sleeve with a crown structure in order to realize a complete green tyre; and moulding and vulcanizing said complete green tyre in order to produce a finished tyre.

16. The process according to claim 15, comprising, after said process for forming beads and before said application of further structural components made of elastomeric compound, rolling over said end flaps turned up, wherein said further structural components comprise sidewalls.

* * * * *